US012641042B2

(12) United States Patent
Bagga et al.

(10) Patent No.: US 12,641,042 B2
(45) Date of Patent: May 26, 2026

(54) DIGITAL WORKER USING HYBRID NLP TECHNIQUE FOR INCIDENT RESOLUTION

(71) Applicant: Fidelity Information Services, LLC, Jacksonville, FL (US)

(72) Inventors: Angad Singh Bagga, Punjab (IN); Mayur Ashish Shiradhonkar, Maharashtra (IN); Rajendran Subramanian, Tamil Nadu (IN); Sudhanshu Shukla, Uttas Pradesh (IN); Gopal Krushna Padhi, Odisha (IN); Myra D'Souza, Leander, TX (US)

(73) Assignee: Fidelity Information Services, LLC, Jacksonville, FL (US)

( * ) Notice: Subject to any disclaimer, the term of this patent is extended or adjusted under 35 U.S.C. 154(b) by 45 days.

(21) Appl. No.: 18/545,656

(22) Filed: Dec. 19, 2023

(65) Prior Publication Data

US 2025/0202843 A1     Jun. 19, 2025

(51) Int. Cl.
*G06F 15/16*          (2006.01)
*G06F 11/07*          (2006.01)
*G06F 40/35*          (2020.01)
*H04L 51/02*          (2022.01)

(52) U.S. Cl.
CPC .......... *H04L 51/02* (2013.01); *G06F 11/0793* (2013.01); *G06F 40/35* (2020.01)

(58) Field of Classification Search
CPC ....... H04L 51/02; G06F 11/0793; G06F 40/35
See application file for complete search history.

(56) References Cited

U.S. PATENT DOCUMENTS

| | | | | |
|---|---|---|---|---|
| 10,366,168 B2 * | 7/2019 | Wu | ........................... | G06N 7/01 |
| 10,581,765 B2 * | 3/2020 | Koukoumidis | ....... | G06F 16/248 |
| 11,327,826 B1 * | 5/2022 | Shama | ................... | G06N 20/00 |
| 2017/0083400 A1 * | 3/2017 | McEwen | .............. | G06F 11/079 |
| 2018/0039618 A1 * | 2/2018 | Kumar | .................... | G06F 40/30 |
| 2018/0196796 A1 * | 7/2018 | Wu | ........................ | G06F 40/289 |
| 2018/0367484 A1 * | 12/2018 | Rodriguez | .............. | H04L 67/75 |
| 2020/0159502 A1 * | 5/2020 | Bodin | .................... | G06N 3/006 |
| 2020/0218995 A1 * | 7/2020 | Neogi | ..................... | G10L 15/22 |
| 2021/0089384 A1 * | 3/2021 | Eberlein | ............. | G06F 11/0793 |
| 2021/0264438 A1 * | 8/2021 | Singh | ................... | G06Q 30/016 |
| 2022/0215323 A1 * | 7/2022 | Dake | ............. | G06Q 10/063114 |
| 2022/0237567 A1 * | 7/2022 | Tiwari | .............. | G06Q 10/1053 |
| 2022/0247700 A1 * | 8/2022 | Bhardwaj | .............. | G06N 3/044 |
| 2023/0100315 A1 * | 3/2023 | Plakkatt | .......... | G06Q 10/06395 705/7.39 |
| 2023/0325748 A1 * | 10/2023 | Duma | ................. | G06F 11/0775 705/7.28 |

OTHER PUBLICATIONS

International Search Report in International Appln. No. PCT/US2024/060666, mailed on Apr. 15, 2025, 14 pages.

* cited by examiner

*Primary Examiner* — Razu A Miah
(74) *Attorney, Agent, or Firm* — Fish & Richardson P.C.

(57) ABSTRACT

The present disclosure relates to methods and systems for natural language processing (NLP). An example method includes techniques enabling a chatbot to join a group conversation, receive a request from a user in the group conversation, and analyze and confirm the authorization level of each member in the group. If each member of the group is authorized, then the chatbot can process the request, including categorizing, selecting a processing approach, and applying the processing approach.

20 Claims, 12 Drawing Sheets

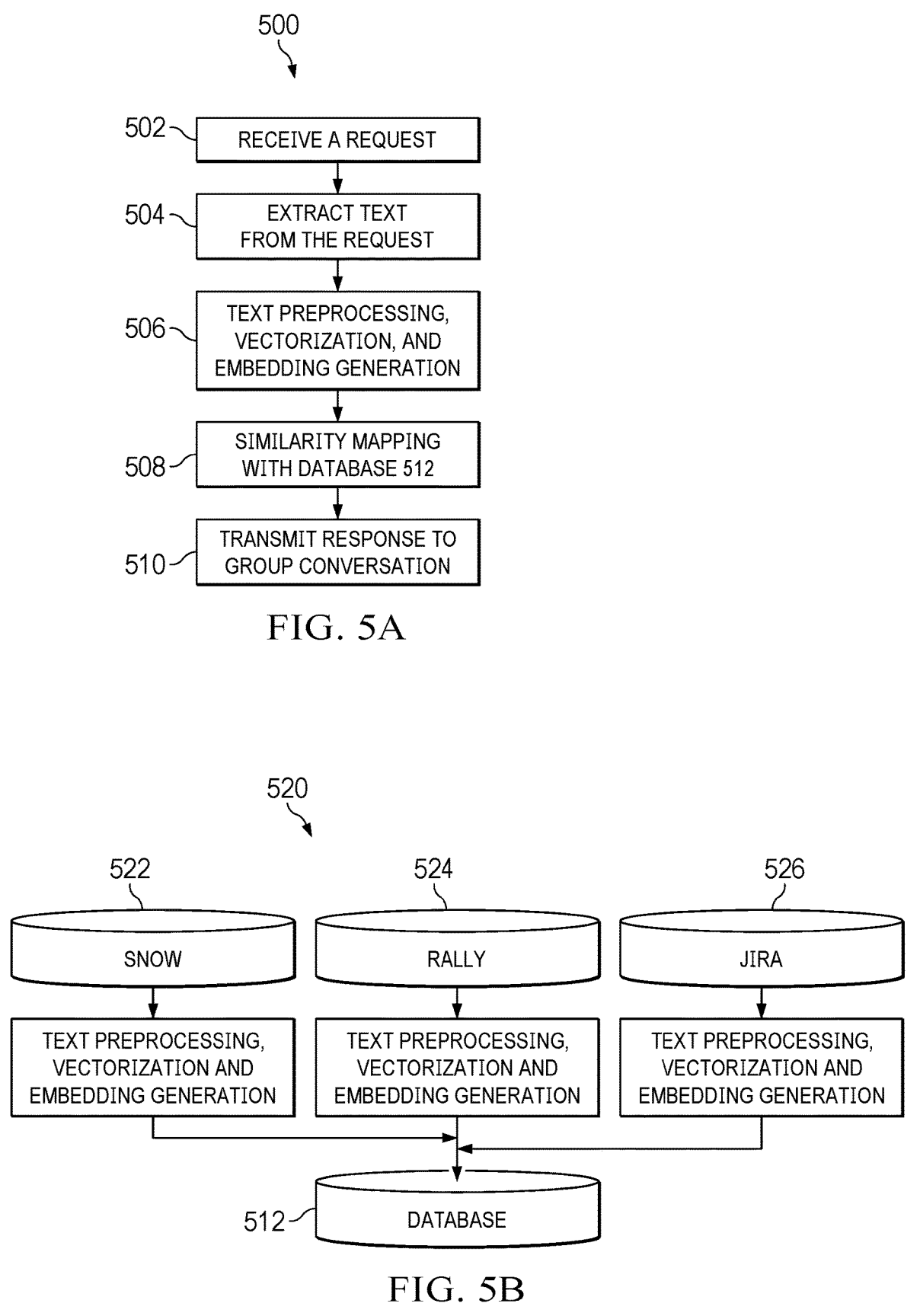

500

502 — RECEIVE A REQUEST

504 — EXTRACT TEXT FROM THE REQUEST

506 — TEXT PREPROCESSING, VECTORIZATION, AND EMBEDDING GENERATION

508 — SIMILARITY MAPPING WITH DATABASE 512

510 — TRANSMIT RESPONSE TO GROUP CONVERSATION

SNOW

RALLY

JIRA

TEXT PREPROCESSING, VECTORIZATION AND EMBEDDING GENERATION

TEXT PREPROCESSING, VECTORIZATION AND EMBEDDING GENERATION

TEXT PREPROCESSING, VECTORIZATION AND EMBEDDING GENERATION

512 — DATABASE

FIG. 5B

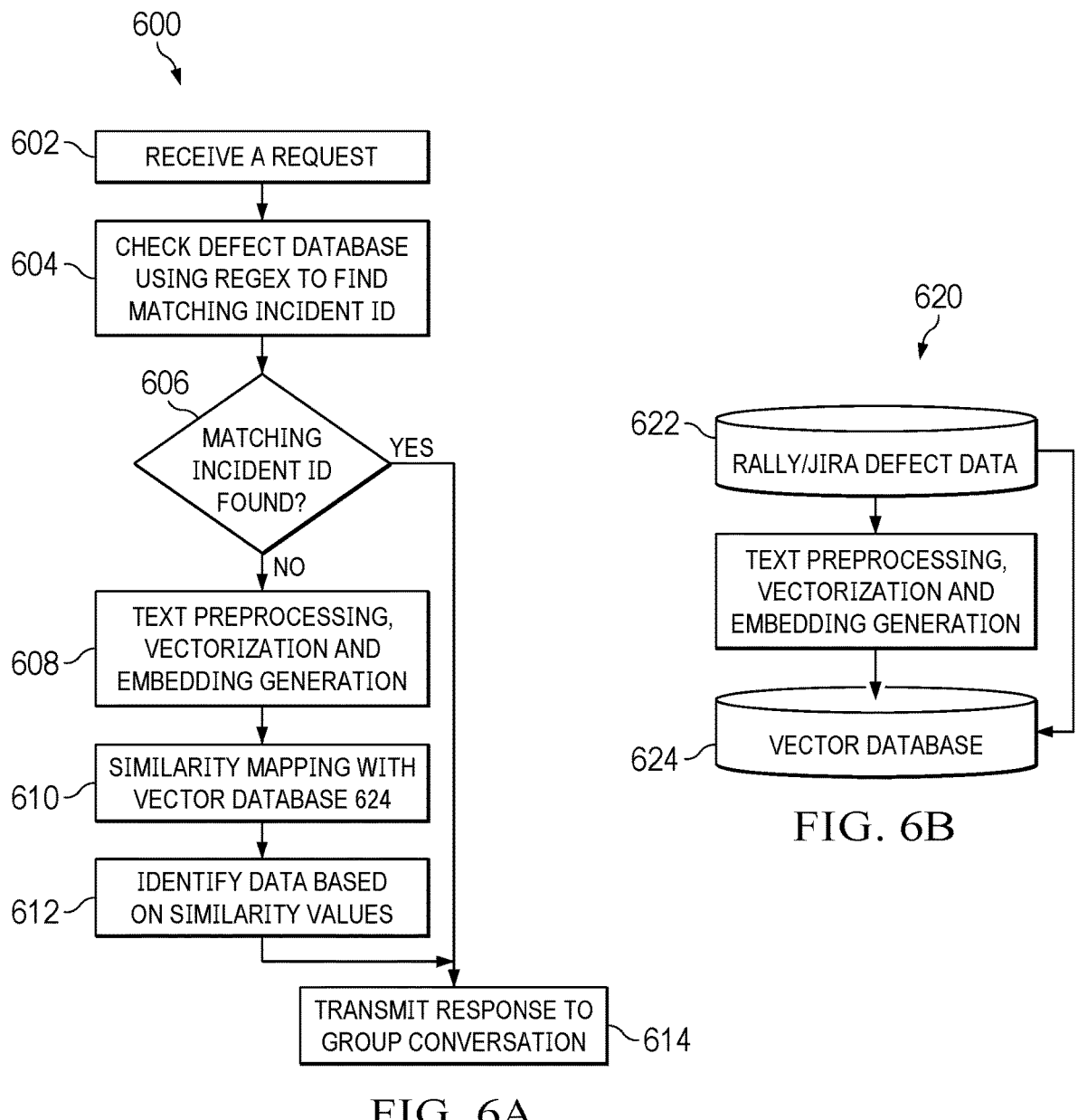

600

602 — RECEIVE A REQUEST

604 — CHECK DEFECT DATABASE USING REGEX TO FIND MATCHING INCIDENT ID

606

MATCHING INCIDENT ID FOUND?

YES

NO

608 — TEXT PREPROCESSING, VECTORIZATION AND EMBEDDING GENERATION

610 — SIMILARITY MAPPING WITH VECTOR DATABASE 624

612 — IDENTIFY DATA BASED ON SIMILARITY VALUES

TRANSMIT RESPONSE TO GROUP CONVERSATION — 614

622 — RALLY/JIRA DEFECT DATA

TEXT PREPROCESSING, VECTORIZATION AND EMBEDDING GENERATION

624 — VECTOR DATABASE

FIG. 6B

DIGITAL WORKER USING HYBRID NLP TECHNIQUE FOR INCIDENT RESOLUTION

TECHNICAL FIELD

The present disclosure relates to natural language processing (NLP) and machine learning (ML).

BACKGROUND

Troubleshooting an information technology (IT) failure or an IT incident can be challenging. IT incidents having a high mean time taken to repair (MTTR) can decrease client satisfaction. Clients expect quick solutions especially when there is a revenue loss. However, determining a root cause of an IT incident can be time consuming and error-prone, which usually requires a collaboration of cross-functional teams. During a major incident, various troubleshooting teams (such as enterprise incident management, application, middleware, infrastructure, security, and network) need a convenient and efficient approach that allows them to communicate in natural human language and give necessary instructions.

SUMMARY

The present disclosure relates to methods and systems for natural language processing (NLP). An example method performed by one or more computers includes joining, by a chatbot, a group conversation in a messaging system in response to receiving an invitation to the group conversation. The method further includes receiving, by the chatbot, a natural language request from a first user in the group conversation, where the natural language request is associated with a current incident. The method further includes identifying, by the chatbot, authorization information associated with each user in the group conversation. The method further includes determining, by the chatbot, one or more authorization requirements associated with the natural language request. The method further includes in response to determining that the identified authorization information associated with each user in the group conversation satisfies the determined one or more authorization requirements associated with the natural language request, determining, by the chatbot, a category of the natural language request. The method further includes determining, by the chatbot, a processing approach based on the category of the natural language request. The method further includes applying, by the chatbot, the processing approach to generate a response.

In some instances, determining the category of the natural language request includes applying a classification machine learning (ML) model to the natural language request to select the category from predetermined categories comprising a rule-based category, a generic category, and a knowledge specific category. The processing approach can include a rule-based natural language processing algorithm when the natural language request belongs to the rule-based category. The processing approach can include a customized ML model when the natural language request belongs to the knowledge specific category. The processing approach can include a fine-tuned large language model (LLM) when the natural language request belongs to the generic category.

In some instances, the natural language request includes a request to extract information associated with the current incident from the group conversation, and applying the processing approach includes applying the rule-based natural language processing algorithm using regular expressions to extract the information from the group conversation.

In some instances, the natural language request includes a request to find incidents in at least one internal database similar to the current incident, and applying the processing approach includes applying the customized ML model to determine similarity values between existing incidents stored in the at least one internal database and the current incident and selecting one or more of the existing incidents based on the similarity values.

In some instances, the natural language request includes a request to find a defect that causes the current incident, and applying the processing approach includes one or more of: applying the customized ML model to use regular expressions to find a first defect stored in at least one internal database and associated with an identity of the current incident, or applying the customized ML model to find a second defect stored in the at least one internal database based on a similarity value between description of the second defect and the current incident.

In some instances, the natural language request includes a request to find a development change that causes the current incident, and applying the processing approach includes: extracting historical development changes within a predetermined time window from at least one internal database, applying the customized ML model to determine similarity values between the historical development changes and the current incident, and selecting one or more of the historical development changes based on the similarity values.

In some instances, the natural language request includes a request to summarize an existing incident stored in at least one internal database, and applying the processing approach includes applying the fine-tuned LLM model to generate a summary of the existing incident.

In some instances, the authorization information associated with each user in the group conversation includes one or more of: whether the user works for an eligible company, whether the user is a member of an eligible internal team of the eligible company, or whether the user has authority to conduct an action in the natural language request.

In some instances, the method further includes transmitting the response to the group conversation and upon request by the first user, sending the response to an email address provided by the first user.

In some instances, the method further includes receiving feedback from the first user and using the feedback as training data to reinforce one or more ML models in the processing approach.

A system includes one or more computers and one or more storage devices storing instructions that when executed by the one or more computers cause the one or more computers to perform operations. The operations include joining, by a chatbot, a group conversation in a messaging system in response to receiving an invitation to the group conversation. The operations further include receiving, by the chatbot, a natural language request from a first user in the group conversation, where the natural language request is associated with a current incident. The operations further include identifying, by the chatbot, authorization information associated with each user in the group conversation. The operations further include determining, by the chatbot, one or more authorization requirements associated with the natural language request. The operations further include in response to determining that the identified authorization information associated with each user in the group conversation satisfies the determined one or more authorization requirements associated with the natural language request, determining, by the chatbot, a category of the natural language request. The operations further include determining, by the chatbot, a processing approach based on the category of the natural language request. The operations further include applying, by the chatbot, the processing approach to generate a response.

In some instances, determining the category of the natural language request includes applying a classification ML model to the natural language request to select the category from predetermined categories comprising a rule-based category, a generic category, and a knowledge specific category. The processing approach can include a rule-based natural language processing algorithm when the natural language request belongs to the rule-based category. The processing approach can include a customized ML model when the natural language request belongs to the knowledge specific category. The processing approach can include a fine-tuned LLM when the natural language request belongs to the generic category.

In some instances, the natural language request includes a request to extract information associated with the current incident from the group conversation, and applying the processing approach includes applying the rule-based natural language processing algorithm using regular expressions to extract the information from the group conversation.

In some instances, the natural language request includes a request to find incidents in at least one internal database similar to the current incident, and applying the processing approach includes applying the customized ML model to determine similarity values between existing incidents stored in the at least one internal database and the current incident and selecting one or more of the existing incidents based on the similarity values.

In some instances, the natural language request includes a request to find a defect that causes the current incident, and applying the processing approach includes one or more of: applying the customized ML model to use regular expressions to find a first defect stored in at least one internal database and associated with an identity of the current incident, or applying the customized ML model to find a second defect stored in the at least one internal database based on a similarity value between description of the second defect and the current incident.

In some instances, the natural language request includes a request to find a development change that causes the current incident, and applying the processing approach includes: extracting historical development changes within a predetermined time window from at least one internal database, applying the customized ML model to determine similarity values between the historical development changes and the current incident, and selecting one or more of the historical development changes based on the similarity values.

In some instances, the natural language request includes a request to summarize an existing incident stored in at least one internal database, and applying the processing approach includes applying the fine-tuned LLM model to generate a summary of the existing incident.

In some instances, the authorization information associated with each user in the group conversation includes one or more of: whether the user works for an eligible company, whether the user is a member of an eligible internal team of the eligible company, or whether the user has authority to conduct an action in the natural language request.

In some instances, the operations further include transmitting the response to the group conversation and upon request by the first user, sending the response to an email address provided by the first user.

One or more non-transitory computer-readable storage media store instructions that when executed by one or more computers cause the one or more computers to perform operations. The operations include joining, by a chatbot, a group conversation in a messaging system in response to receiving an invitation to the group conversation. The operations further include receiving, by the chatbot, a natural language request from a first user in the group conversation, where the natural language request is associated with a current incident. The operations further include identifying, by the chatbot, authorization information associated with each user in the group conversation. The operations further include determining, by the chatbot, one or more authorization requirements associated with the natural language request. The operations further include in response to determining that the identified authorization information associated with each user in the group conversation satisfies the determined one or more authorization requirements associated with the natural language request, determining, by the chatbot, a category of the natural language request. The operations further include determining, by the chatbot, a processing approach based on the category of the natural language request. The operations further include applying, by the chatbot, the processing approach to generate a response.

DESCRIPTION OF DRAWINGS

FIGS. 5A-5B illustrate a flow chart of an example customized machine learning (ML) model, according to some aspects of the present disclosure.

FIGS. 6A-6B illustrate a flow chart of another example customized ML model, according to some aspects of the present disclosure.

DETAILED DESCRIPTION

Figure 1:
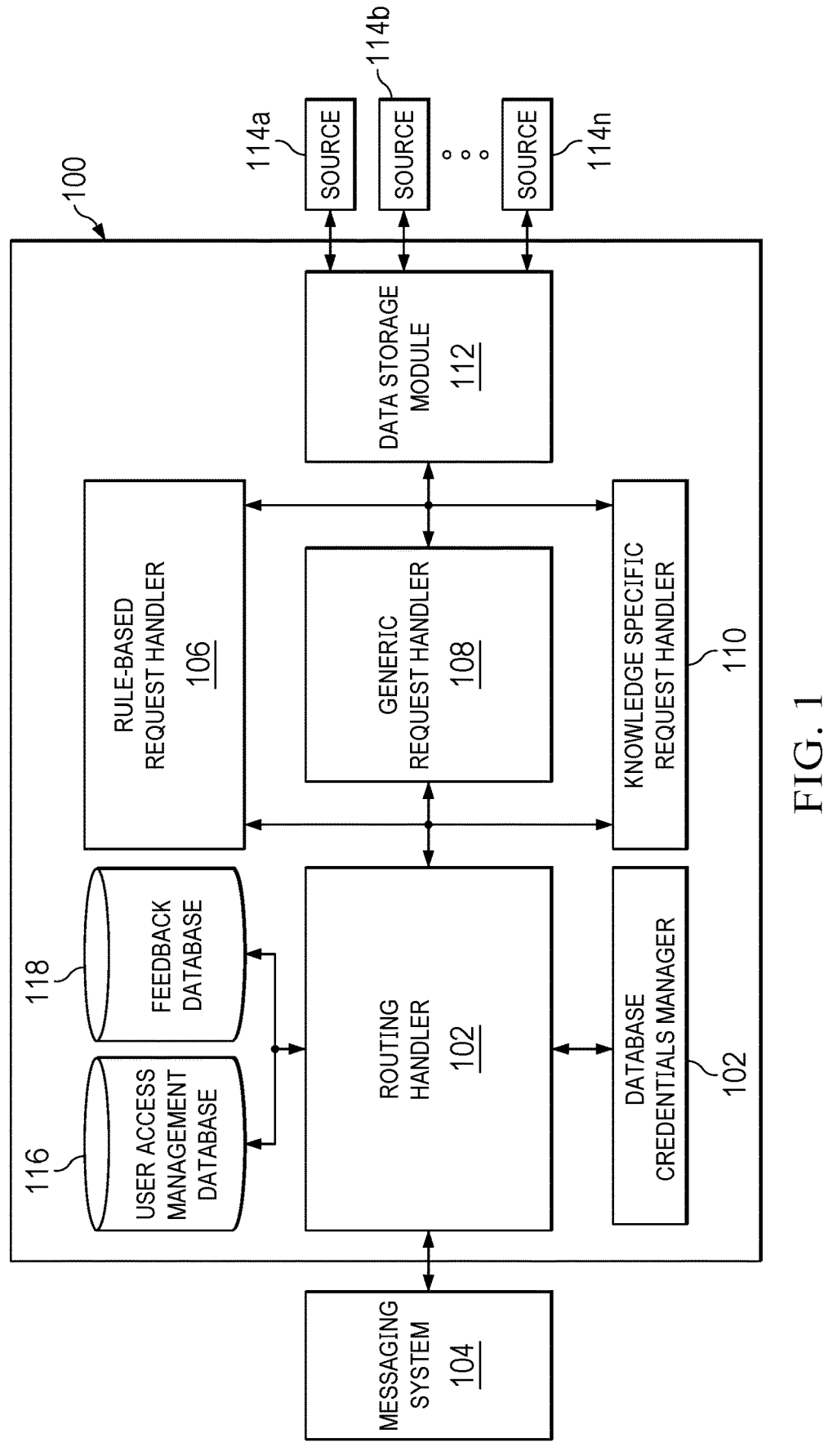
FIG. 1 illustrates an example system, according to some aspects of the present disclosure.

When an incident occurs in an information technology (IT) service or an IT product provided by a company, troubleshooting teams of the company can collaborate to find a solution. Members in the troubleshooting teams can communicate with each other in a group conversation using an instant messaging system (e.g., Microsoft Teams and Skype). While they are describing anomalies and symptoms of the incident and assigning tasks to each individual based on their roles and responsibilities in the group conversation, the members also use various troubleshooting tools to track and analyze the incident. The troubleshooting tools can include incident or issue tracking systems such as Service Now and JIRA and log storage and analysis tools such as Dynatrace, Splunk, and corporate Data Lake (e.g., Data Lake created on Microsoft Azure cloud platform for obtaining corporate data). In some implementations, the members also need to track real-time operating status of a remote database server. It can be difficult to perform these tasks using different user interfaces at the same time. Therefore, techniques to make incident troubleshooting more convenient and more efficient are desired.

The present disclosure provides systems and methods that can perform intelligent dialog recognition and management based on natural language processing (NLP) and machine learning (ML) techniques. In one example implementation, a method includes joining, by a chatbot, a group conversation in a messaging system in response to receiving an invitation to the group conversation. The chatbot can receive a natural language request from a first user in the group conversation, where the natural language request is associated with a current incident. The chatbot can identify authorization information associated with each user in the group conversation and determine one or more authorization requirements associated with the natural language request. In response to determining that the identified authorization information associated with each user in the group conversation satisfies the determined one or more authorization requirements associated with the natural language request, the chatbot can determine a category of the natural language request. The method further includes determining, by the chatbot, a processing approach based on the category of the natural language request and applying, by the chatbot, the processing approach to generate a response.

The subject matter described in this disclosure can be implemented to realize one or more of the following advantages. The present disclosure provides a hybrid approach for solving an IT incident, which first identifies an intent of a request and then intelligently determines an NLP approach or a ML model for processing the request. The proposed approach enables integration of various incident tracking and troubleshooting systems (e.g., Confluence, Service Now, Rally, Dynatrace, Splunk) in one single interface. The proposed approach provides a flexible microservice-based architecture that combines different NLP and ML techniques such as rule-based NPL approaches, customized ML models, and a large language model (ML). The proposed approach also can prevent unauthorized usage using a multi-level authorization evaluation procedure.

FIG. 1 illustrates an example system 100, according to some aspects of the present disclosure. The system 100 is an example of a system implemented as computer programs on one or more computers in one or more locations, in which the systems, components, and techniques described below can be implemented. System 100 can represent a plurality of systems working together, and may be communicably connected via network or other connections. For example, a messaging system 104 can include applications executing at various systems, including by different users, where a portion of the messaging system 104 can be associated with applications running on user devices or systems, with at least one portion of the messaging system 104 associates with an intelligent worker or automated messaging participant or application.

The system 100 is configured to receive requests from users participating in a group conversation. The requests can be natural language requests. The group conversation can, at some point during its existence and/or during the course of the discussion, be associated with an incident in an IT service or an IT product provided by a company. In some instances, a chat with users in the messaging system 104 can be used to discuss the particular incident, at least in part to assist in incident management. Normal chat functionality of the messaging system 104 can be used without reference to a particular incident, as well. The incident can refer to a failure or an unexpected event that disrupts a normal operation of the IT product or reduce a quality of the IT service, as well as any other unexpected or potential issue identified by the users or by portions of the IT system or service. The users in the group conversation may be associated with different internal teams of the company, and may be joined in a conversation in an effort to troubleshoot the incident. In other words, the users may be collaborating using the group conversation as a communication tool, and are trying to solve or troubleshoot the incident. The system 100 is configured to process the requests from the users, generate responses, and send the responses to the group conversation to make the troubleshooting process more productive.

The users can participate in the group conversation using a messaging system 104. The messaging system 104 can be any suitable instant messaging applications or platforms such as Microsoft Teams, Bing Chat, WhatsApp, Skype, or Facebook Messenger, etc. In some implementations, the requests from the group conversation can be text-based messages (e.g., via a web interface, via a specific application, via SMS/MMS applications, etc.). In some other implementations, the users in the group conversation can send voice messages, and the voice messages can be converted to text messages (either by the messaging system 104 or by the system 100), and/or interpreted by the backend upon submission.

The system 100 can instantiate an instance of a chatbot (also referred to as a digital assistant or a digital worker) for the messaging system 104. A user in the group conversation can add the chatbot to the group conversation, such as by adding the chatbot as a participant to the conversation, or by any other suitable method. Then, the system 100 can poll the group conversation in the messaging system 104 periodically (e.g., every 30 seconds) to review messages from the group conversation through the chatbot to determine if any requests, questions, or interactions have occurred needing the chatbots participation and functionality. The messages reviewed by the system can include messages the users send to each other and/or messages or requests the users send to the chatbot. The system 100 also can send responses back to the group conversation through the chatbot. In some instances, a single user could start a chat conversation directly with the chatbot using the messaging system 104, or other users in the chat may drop out, remove themselves, or be removed, leaving only a single user and the chatbot.

As shown in FIG. 1, the system 100 includes a routing handler 102. The routing handler 102 can communicate with the messaging system 104 through an application programming interface (API) provided by the messaging system 104. The routing handler 102 is coupled to and/or associated with different request handlers in the system 100. For example, as shown in FIG. 1, the request handlers can include a rule-based request handler 106, a generic request handler 108, and a knowledge specific request handler 110. The request handlers can apply NLP approaches and/or ML models that are suitable for processing a specific type of request. When receiving a request from a user in the group conversation, the routing handler 102 can be configured to intelligently understand the request, identity an intent of the user, determine a category of the request, and route the request to an appropriate request handler based on the determined category. In some implementations, the routing handler 102 can apply a classification ML model to the request to select the category from predetermined categories, such as a rule-based category, a generic category, and a knowledge specific category. The classification ML model can be a text classifier trained using example requests. When the routing handler 102 receives the request, the text classifier can determine a similarity match between a vector embedding of the request and vector embeddings of the example requests, and then can classifies the request into one of the predetermined categories. In some implementations, the routing handler 102 can split one request into multiple sub-requests. Then, the routing handler 102 can determine a category of each sub-request, and can send each sub-request to a corresponding request handler. The routing handler 102 can combine responses to the sub-requests from different request handlers and send the combined responses back to the group conversation.

The request handlers of the system 100 (e.g., the rule-based request handler 106, the generic request handler 108, and the knowledge specific request handler 110) can be configured to train NLP approaches and/or ML models using data stored in a data storage module 112. The data in the data storage module 112 can be collected from one or more sources 114a, 114b, . . . , 114n. The sources 114a-114n can include any suitable databases or data platforms such as Cortex Data Lake (CDL), Dynatrace, or Splunk. In some implementations, a request handler is configured to search or analyze the data (e.g., event logs or alerts) stored in the data storage module 112.

Figure 3:
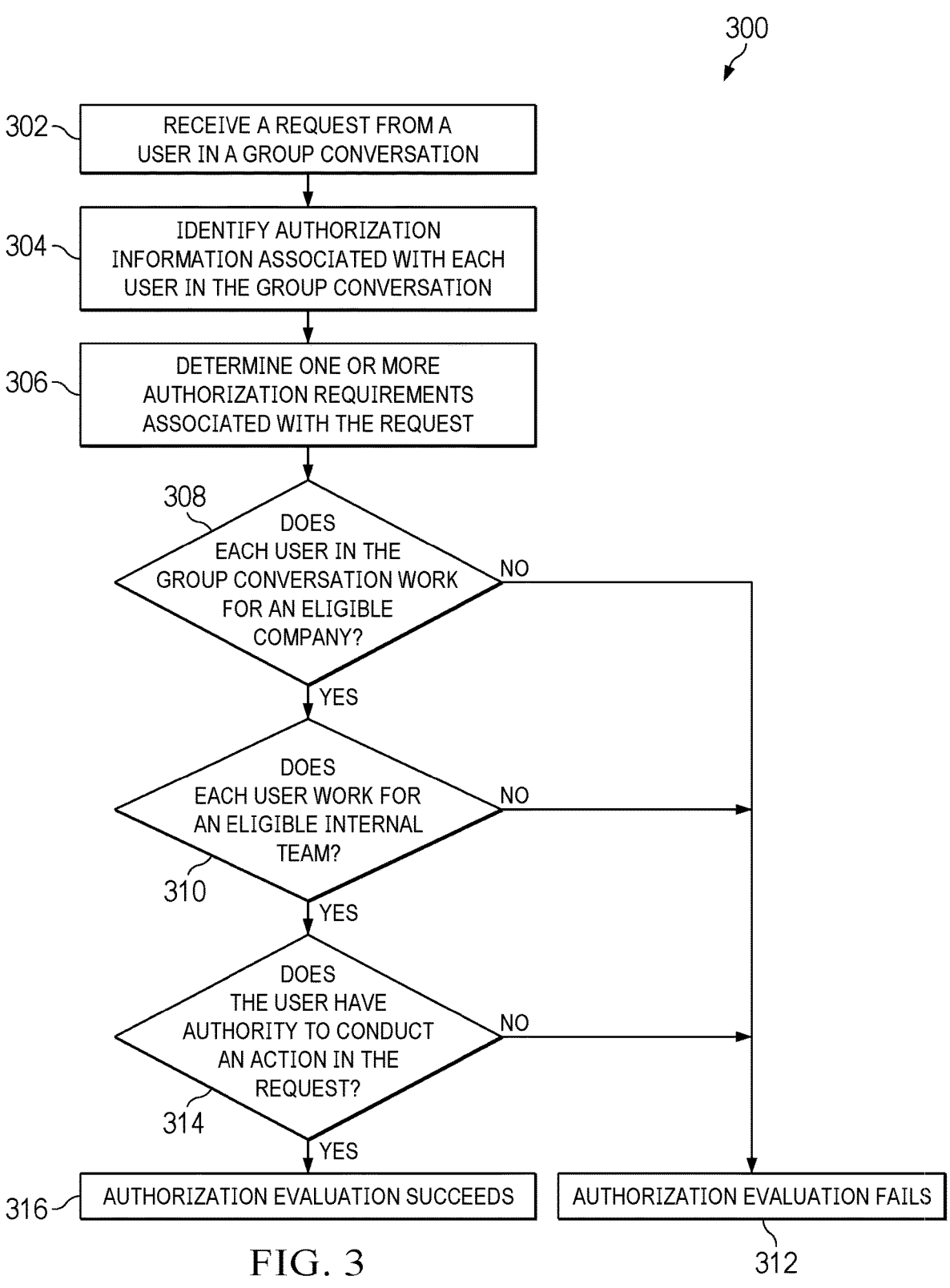
FIG. 3 illustrates a flow chart of an example authorization evaluation procedure, according to some aspects of the present disclosure.

The system 100 can further include a user access management database 116, which can store access control or authorization related information as described with further details with respect to FIG. 3. For example, the user access management database 116 can be leveraged by the routing handler 102 to determine the access rights of the various users in the group conversation. Using that determined information, the routing handler 102 can identify and allow users with proper authorization to work with the chatbot, while conversations including non-authorized users may not be used with the chatbot. In some implementations, a non-authorized user may not be allowed to interact with the chatbot because, for example, the user is not working for an eligible company.

The system 100 can further include a feedback database 118. The system 100 can save user feedback and usage metrics in the feedback database 118, which can be used to train or reinforce the NLP approaches and ML models of various request handlers in the system 100 and improve the performance (e.g., reducing the response time and increasing the accuracy) of the system 100. The usage metrics can include alerts and logs generated during operation of the system 100, reports on functionality of each component, and usage statistics such as which ML model is triggered most often, etc. The feedback database 118 can continuously enhance the performance of the system 100. In some implementations, if the system 100 is not performing well, potential areas for improvement can be identified based on the user feedback and usage metrics, which can help the system 100 fine tune or re-tune the ML models.

The system 100 can further include a database credential manager 120, which stores login credentials (e.g., usernames and passwords) that the system 100 can use to access incident managing systems or issue tracking systems such as Service Now, Rally, and JIRA. The database credential manager 120 may also be associated with other enterprise-level security systems, where access to various systems and knowledge bases may be obtained through use of valid credentials. In some instances, the credentials may be associated with the routing handler 102 (or other routing handlers), while in others, the credentials may be associated with particular users associated with the group conversation.

In some implementations, the system 100 can be implemented on a cloud computing platform such as Amazon Web Services (AWS). For example, the routing handler 102, the rule-based request handler 106, the generic request handler 108, and the knowledge specific request handler 110 can be launched at Amazon Elastic Compute Cloud (EC2). The database credential manager 120 can be provided by an AWS secrets manager, and the data storage module 112 can be implemented using Amazon S3 Object Lambda.

FIGS. 2A-2G illustrate some example interactions with a chatbot generated by the system 100 of FIG. 1, according to some aspects of the present disclosure.

Figure 2A:
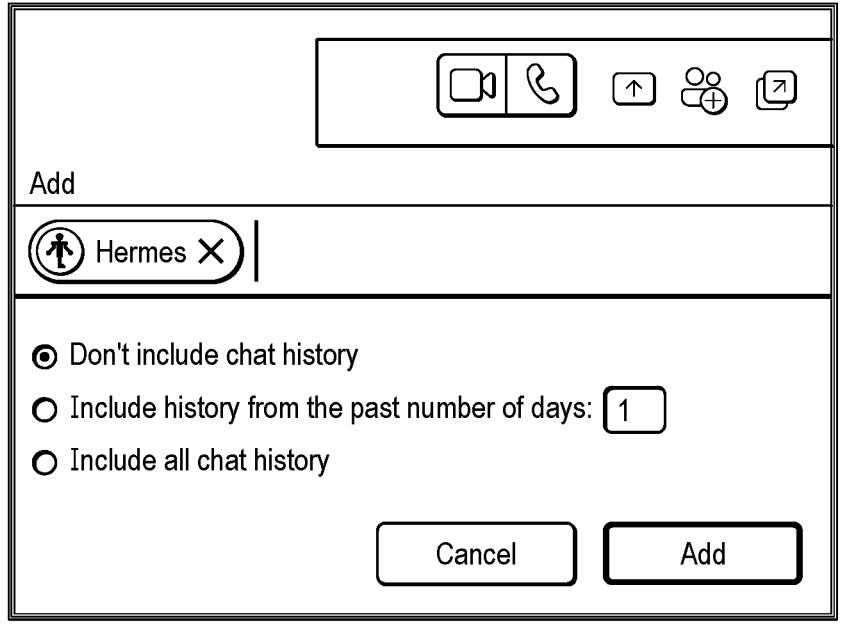
FIGS. 2A-2G illustrate some example interactions with a chatbot generated by the system of FIG. 1, according to some aspects of the present disclosure.

FIG. 2A shows that a Teams user can add the chatbot to a Teams group chat by clicking an "add people" button on a group chat interface and typing the username of the chatbot (e.g., "Hermes" as shown in FIG. 2A). In some instances, a dedicated button or UI may be associated with the chatbot, allowing a one-click addition of the chatbot to a conversation.

Figure 2B:
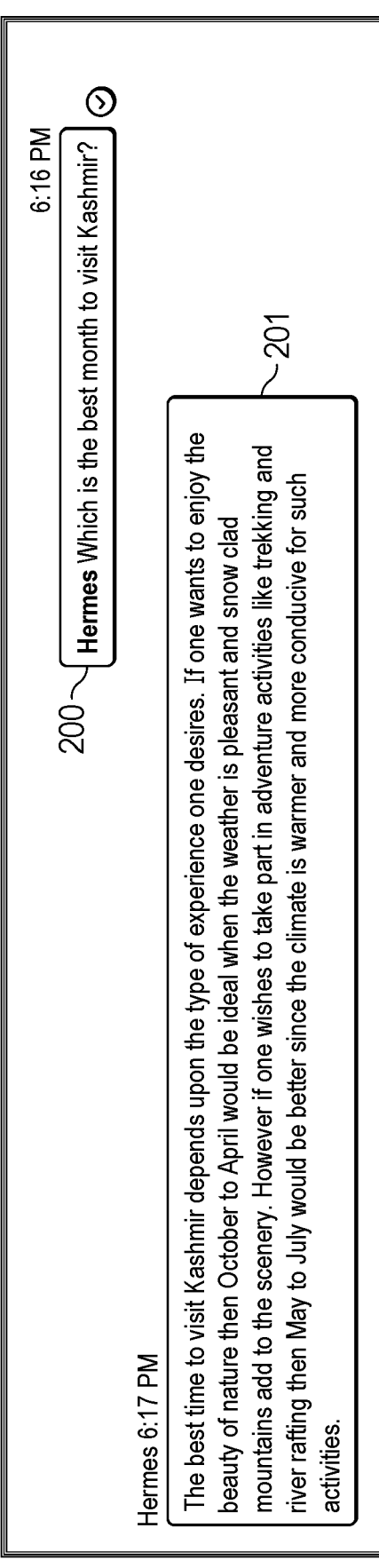

FIG. 2B shows that a user participating in the group chat submits a request 200 "Which is the best month to visit Kashmir?" to the chatbot by typing the request 200 following the username of the chatbot. The request 200 is a generic question, and the chatbot generates a response 201.

Figure 2C:
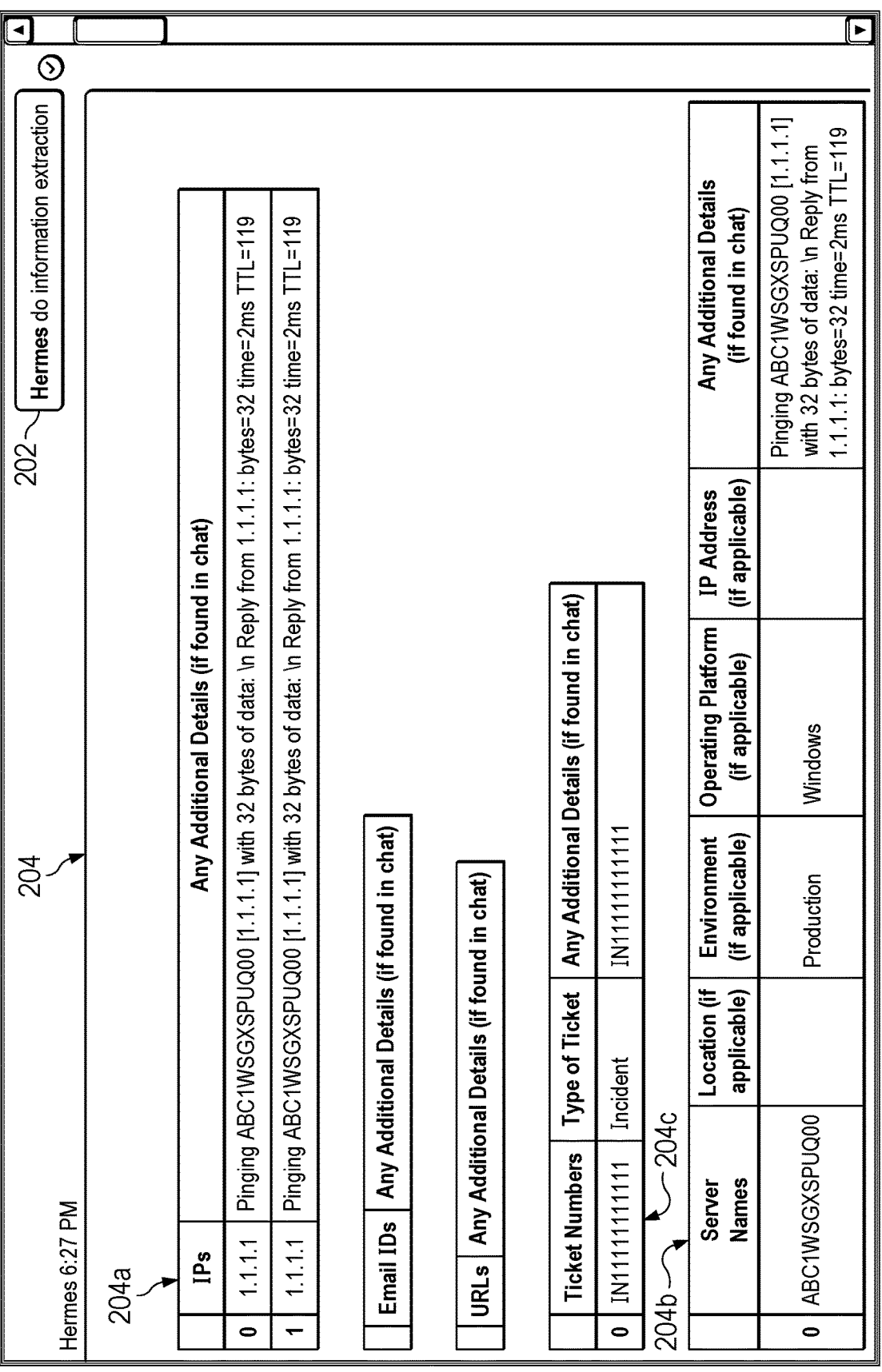

FIG. 2C shows that a user in a group chat submits a request 202 "do information extraction" to the chatbot. The request 202 asks the chatbot to extract information from the current group chat. The chatbot generates a response 204, which provides two IP addresses 204a, a server 204b, and a ticket 204c (which can include a ticket number and ticket details) of an incident that were previously mentioned in the current group chat. While not shown in this example, the chatbot can extract other information from the group chat such as email IDs, uniform resource locators (URLs), locations, environments, and operating platforms if any of such information has been mentioned in the group chat. The content and format of the extracted information can be customized based on the user's specific requirements. In some implementations, the extracted information is applicable for suitable platforms, networks, and Infra teams within an eligible company.

Figure 2D:
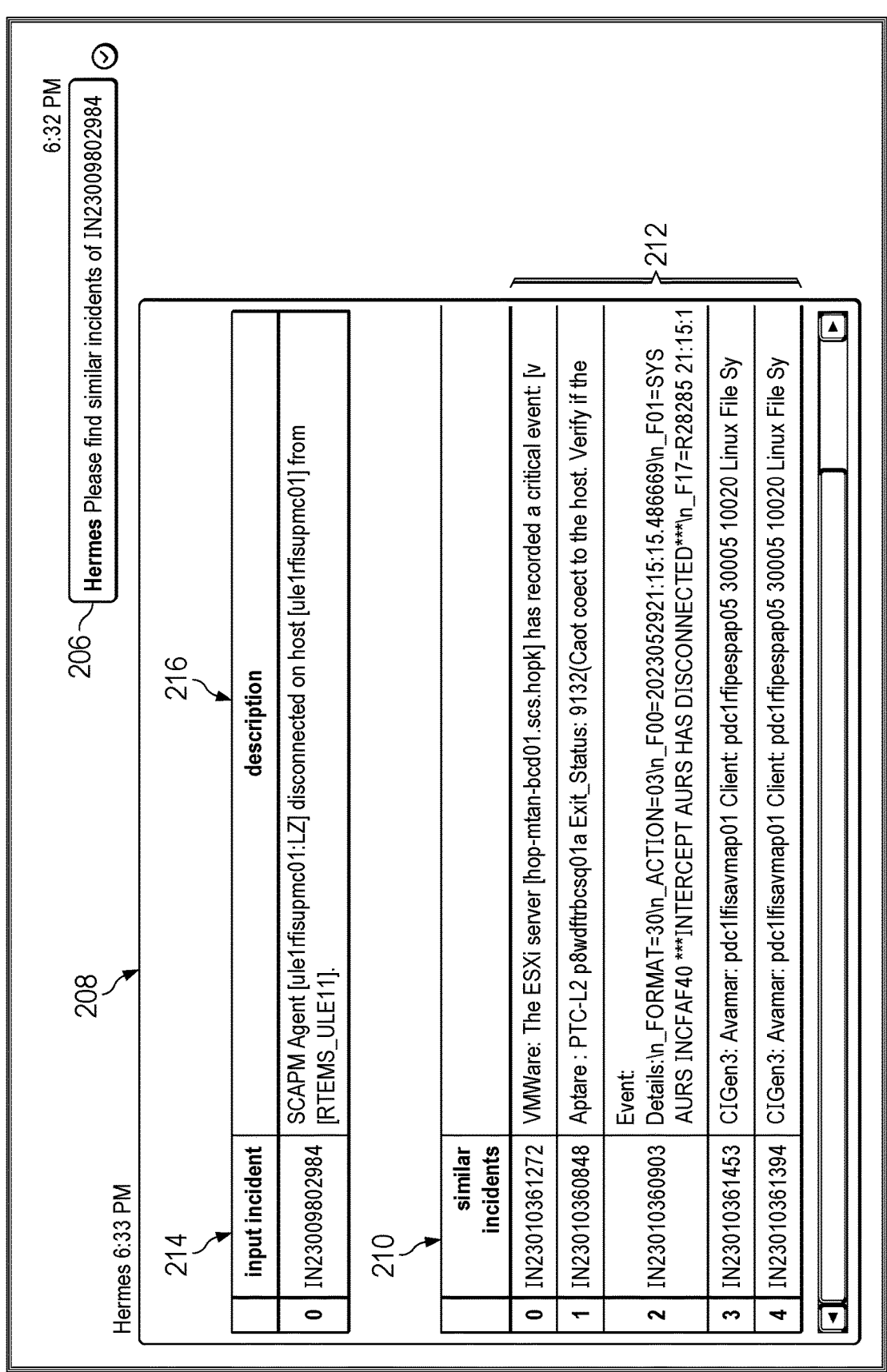

FIG. 2D shows that a user in a group chat submits a request 206 "Please find similar incidents of IN23009802984" to the chatbot. The request 206 provides a ticket ID of an input incident and asks the chatbot to find existing incidents in an incident tracking system (e.g., Service Now, Rally, or JIRA) that are similar to the input incident. Based on the routing handler 102 existing connection to particular systems, the chatbot can generate a response 208, which includes a ticket ID 210 and a short description for each of the similar incidents 212. The response 208 can also include the ticket ID 214 and a short description 216 for the input incident.

Figure 2E:
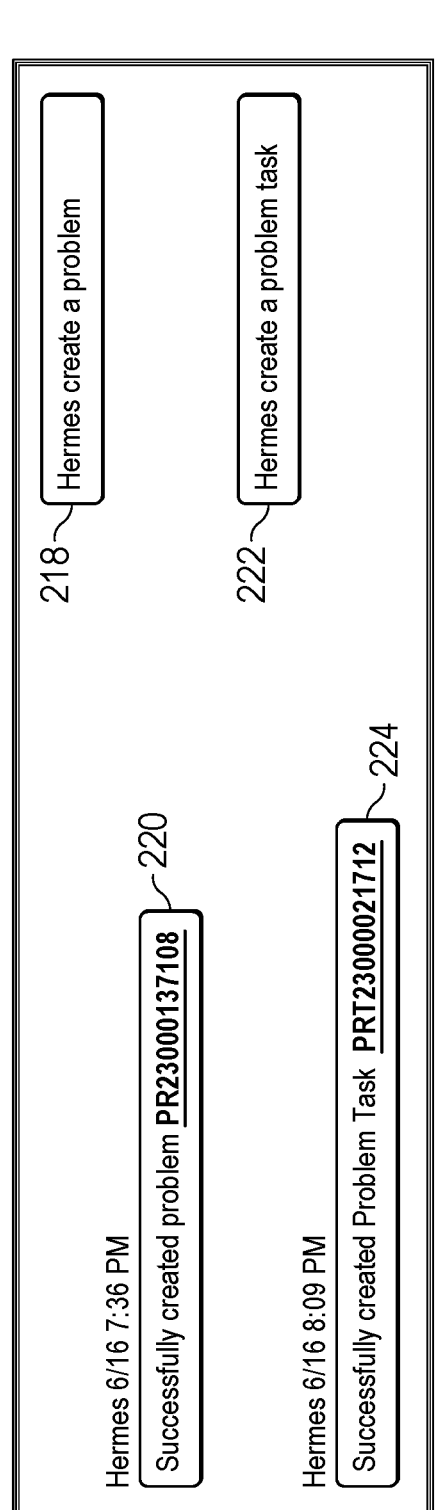

FIG. 2E shows that a user in a group chat submits a request 218 "create a problem" to the chatbot. The chatbot understands that the request 218 asks the chatbot to create a new problem in the incident tracking system (e.g., Service Now), which can be used to track a cause of an incident described during the group chat. After interacting with Service Now and successfully creating the problem, the chatbot responds to the group chat (220). As shown in FIG. 2E, the user can submit another request 222 "create a problem task" to the chatbot. The chatbot receives the request 222, understands that the request 222 asks the chatbot to create a problem task in Service Now, successfully creates the problem task as requested, and provides a response 224 to the group chat.

Figure 2F:
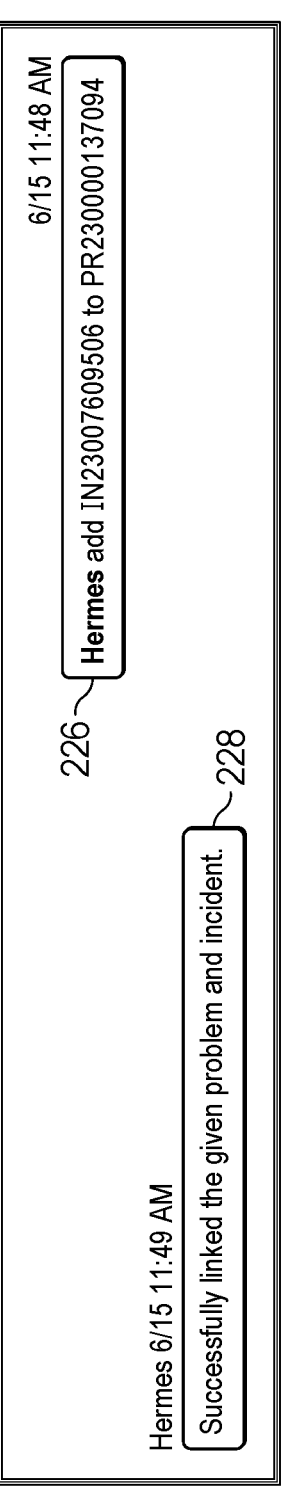

FIG. 2F shows that a user in a group chat submits a request 226 "add IN23007609506 to PR23000137094" to the chatbot. The chatbot understands that the request 226 asks the chatbot to link a problem to an incident in the incident tracking system (e.g., Service Now). After interacting with the incident tracking system and successfully linking the problem and the incident, the chatbot responds to the group chat (228).

Figure 2G:
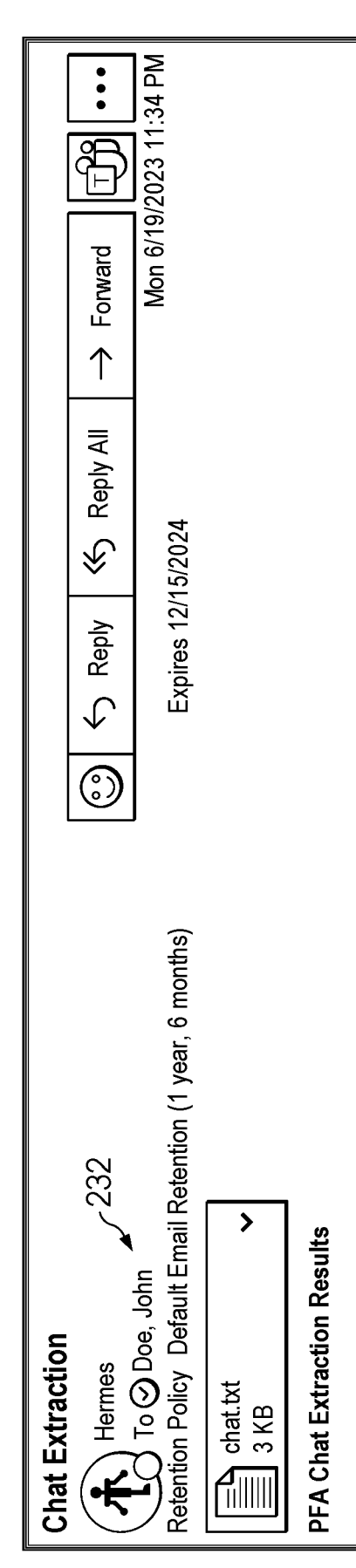

FIG. 2G shows that a user in a group chat submits a request 230 "do chat extraction" to the chatbot. The request 230 asks the chatbot to generate a copy of a history of the current group chat. The chatbot includes the chat history in a txt file "chat.txt" and transmits the txt file to the group chat (232).

It should be noted that the chatbot may receive different types of requests (e.g., as described with respect to FIGS. 2B-2G) in the same group conversation. Furthermore, these different requests can be submitted by either the same user or by different users in the same group conversation.

In some implementations, the chatbot can generate a response for each request in response to determining that users participating in the group chat (including the user who submits the request) pass through an authorization evaluation procedure. The authorization evaluation procedure can also be referred to as a security check. One purpose of the authorization evaluation procedure is to prevent an unauthorized user from bypassing an internal authorization or validation process using the chatbot.

FIG. 3 illustrates a flow chart of an example authorization evaluation procedure 300, according to some aspects of the present disclosure. For convenience, the authorization evaluation procedure 300 will be described as being performed by a system of one or more computers located in one or more locations (e.g., the system 100 of FIG. 1).

At 302, the system receives a request (e.g., a natural language request) from a user in a group conversation. The system can receive the request through a chatbot added to the group conversation (e.g., as described with respect to FIG. 1 and FIGS. 2A-2G). In some implementations, the authorization evaluation procedure 300 can be triggered when the user sends a request to the chatbot. In other implementations, the authorization evaluation procedure 300 can be triggered when the chatbot is added to the group conversation.

At 304, the system identifies authorization information associated with each user in the group conversation. The authorization information associated with each user in the group conversation can include, in some examples, one or more of the following: whether the user works for an eligible company, whether the user is a member of an eligible internal team of the eligible company, or whether the user has authority to conduct an action comprised in the request. Other potential authorization information can be obtained and used in the determination, as well. The authorization information associated with each user in the group conversation can be stored in the user access management database 116 of FIG. 1.

At 306, the system determines one or more authorization requirements associated with the request. In this example, the authorization requirements associated with the request includes: 1) each user in the group conversation works for the eligible company, 2) each user is a member of an eligible internal team of the eligible company, and 3) the user who submits the request has authority to conduct an action comprised in the request.

At 308, the system checks if the first authorization requirement is satisfied. The authorization evaluation procedure 300 proceeds to 310 if each user in the group conversation works for the eligible company. An eligible company can be a company who developed a product that has an incident or a company who is responsible for solving the incident. Otherwise, if the group conversation includes an external user who does not work for the eligible company, the authorization evaluation procedure 300 fails and proceeds to 312.

At 310, the system checks if the second authorization requirement is satisfied. The authorization evaluation procedure 300 proceeds to 314 if each user in the group conversation belongs to an eligible internal team of the eligible company. An eligible internal team can be an internal team who is authorized to use the system or an internal team who is responsible for troubleshooting the incident. Otherwise, if the group conversation has a user who is not from an eligible internal team, the authorization evaluation procedure 300 fails and proceeds to 312.

At 314, the system checks if the third authorization requirement is satisfied, which requires the user who submits the request to have authority to conduct an action comprised in the request. Whether the user has authority can depend on factors including the user's identity, the user's role, a ranking or seniority of the user, or a security clearance level of the user, among others. For example, a member of a bill pay department may not submit a request to operate a database of a health department. In another example, the request may ask the system to create a problem ticket in the incident tracking system. The incident tracking system may have a limitation such that only a problem manager can create a problem ticket. Thus, if the user submitting the request is a problem manager of the incident tracking system, then the third authorization requirement is satisfied because the user has authority to conduct the action comprised in the request (e.g., creating a problem ticket). As a result, the authorization evaluation procedure 300 succeeds and proceeds to 316. Otherwise, if the user submitting the request does not have a role as a problem manager of the incident tracking system, then the third authorization requirement is not satisfied, and the authorization evaluation procedure 300 fails and proceeds to 312.

At 316, in response to determining that the authorization evaluation has succeeded and all requirements are met, the system can start to process the request.

In some implementations, if the system determines that the authorization evaluation has failed (312), the system can send a message to the group conversation to indicate the failure of the authorization evaluation procedure. The message can include further information about a specific reason why the authorization evaluation failed. In some instances, the message can even provide a remedy to correct the authorization evaluation failure. For example, if the authorization evaluation failed because a user is not from an eligible internal team, the message can provide detailed onboarding steps illustrating how an internal team can register and become eligible to use the system. In another example, if the authorization evaluation failed because a user who submits a request does not have a relevant role for the request, the message can provide a link which the user can click and apply for the relevant role. In some instances, an option to remove a particular user from the group conversation may be provided or available, such that, once the user is removed, the request can be resubmitted and processed.

Figure 4:
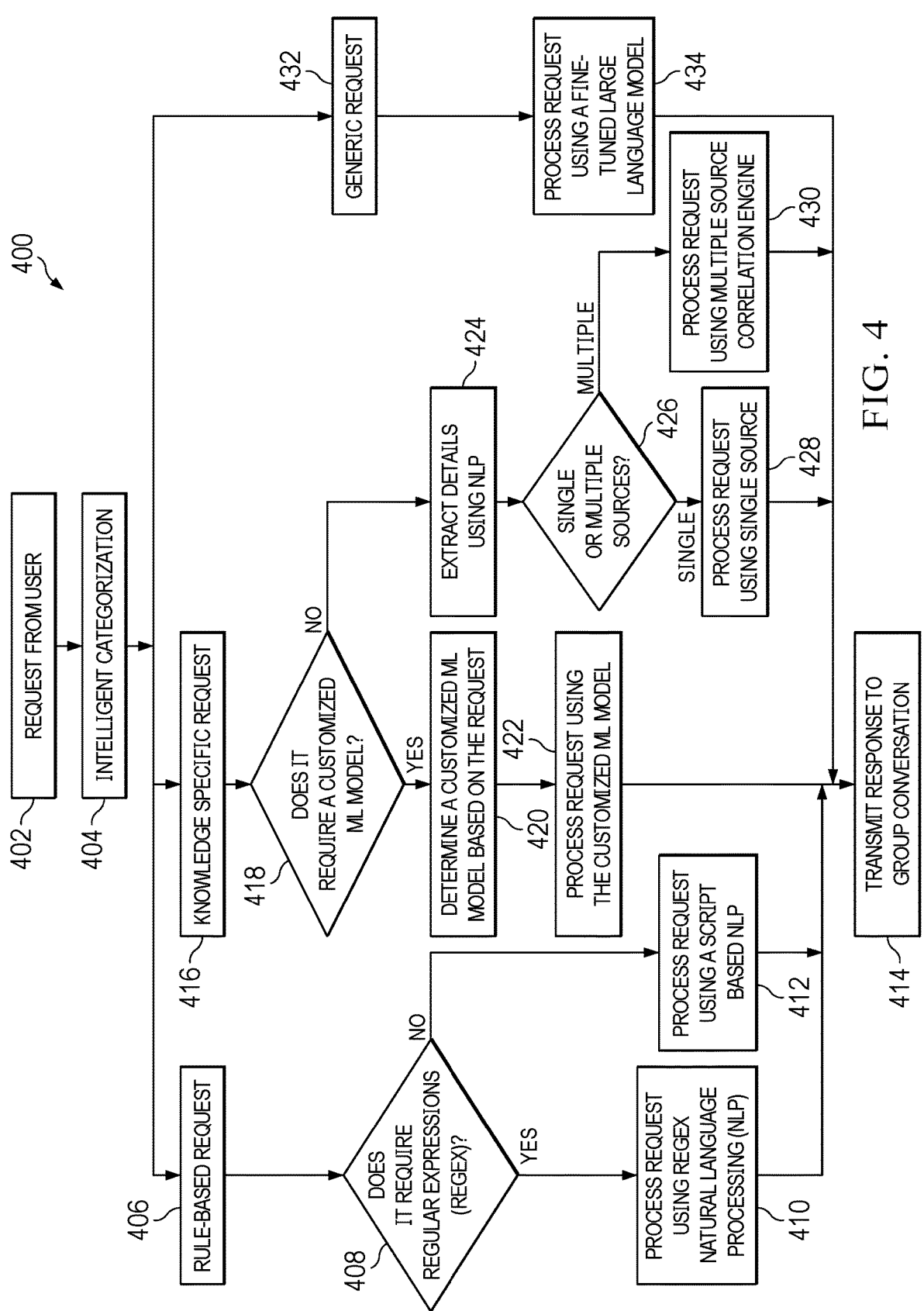
FIG. 4 illustrates a flow chart of an example request processing procedure, according to some aspects of the present disclosure.

FIG. 4 illustrates a flow chart of an example request processing procedure 400, according to some aspects of the present disclosure. For convenience, the request processing procedure 400 will be described as being performed by a system of one or more computers located in one or more locations (e.g., the system 100 of FIG. 1).

At 402, the system receives a request from a user in a group conversation. The group conversation can be associated with a current incident. For example, users in the group conversation may be associated with various troubleshooting teams, and are analyzing the current incident. In some implementations, an authorization evaluation procedure may not be needed, and the request processing procedure 400 can proceed to 404 directly. In some other implementations, the request processing procedure 400 can proceed to 404 if the authorization evaluation procedure has been performed and has succeeded (e.g., as described with respect to FIG. 3).

At 404, the system determines a category of the request. The system can apply a classification ML model to the request to select the category from predetermined categories, such as a rule-based category, a generic category, and a knowledge specific category as in the present example.

A rule-based request can be a request to extract information associated with the current incident from the group conversation (e.g., the request 202 of FIG. 2C). The information associated with the current incident can include one or more of IP addresses, incident ticket numbers, email IDs, URLs, server names, locations, environments, and operating platforms. In some implementations, a rule-based request can also be a request to perform a health check on a database server or a request to extract a chat history of the group conversation (e.g., the request 230 of FIG. 2G).

A generic request can be a request on a generic topic (e.g., the request 200 of FIG. 2B), which may not relate to an IT incident. A knowledge specific request can be a request that relates to an internal knowledge system such as an incident tracking system, a log analysis database, or a database that records recent changes to a development source code of a product.

A knowledge specific request can include a request to find incidents in internal databases similar to the current incident (e.g., the request 206 of FIG. 2D), a request to find a defect that causes the current incident, and a request to find a development change that causes the current incident.

In some implementations, the classification ML model can be trained using example requests. In some implementations, the classification ML model can be applied by the routing handler 102 of FIG. 1. The routing handler 102 can select a request handler (e.g., the rule-based request handler 106, the generic request handler 108, and the knowledge specific request handler 110 of FIG. 1) based on the category of the request and send the request to the selected request handler. The selected request handler can then determine a processing approach and apply the process approach to the request to generate a response.

If the request is a rule-based request, the request processing procedure 400 proceeds to 406, where the request is processed by a rule-based request handler of the system (e.g., the rule-based request handler 106). The system can apply a rule-based NLP algorithm to the request. In some implementations, the rule-based NLP algorithm can be an NLP algorithm based on regular expressions (Regex). In some implementations, the rule-based NLP algorithm can be an NLP algorithm based on scripts.

At 408, if the system determines that the request can be processed using a Regex-based NLP algorithm (for example, the request is a request to extract information like the request 202 of FIG. 2C), the request processing procedure 400 proceeds to 410. At 410, the system can select a suitable Regex-based NLP algorithm and apply the selected algorithm to the request to extract information (such as IP addresses, incident ticket numbers, and email IDs) and generate a response.

At 408, if the system determines that the request cannot be processed using a Regex-based NLP algorithm (for example, the request is a request to check health of a database server), the request processing procedure 400 proceeds to 412. At 412, the system can select a suitable script-based NLP algorithm. For example, the selected script-based NLP algorithm can trigger a script to perform health check of the database server as instructed by the request. The system can apply the selected script-based NLP algorithm to the request and generate a response.

At 414, the system can transmit the generated response to the group conversation. This way, users participating in the group conversation can share the response, which can make the troubleshooting process more productive. In some implementations, as requested by the user who submits the request, the system can also send the response as an email to an email address provided by the user.

If the request is determined to be a knowledge specific request at 404, the request processing procedure 400 proceeds to 416, where the request is processed by a knowledge specific request handler of the system (e.g., the knowledge specific request handler 110).

At 418, if the system determines that the request can be processed using a customized ML model (for example, the request is a request to find incidents in internal databases similar to a current incident like the request 206 of FIG. 2D), the request processing procedure 400 proceeds to 420, where the system determines a customized ML model based on the request.

At 422, the system can apply the customized ML model to the request and generate a response. Examples of the customized ML model are described with further details with respect to FIGS. 5A-5B, 6A-6B, and 7. Then the request processing procedure 400 goes from 422 to 414.

Returning to 418, if the system determines that the request may not be processed using a customized ML model, the request processing procedure 400 proceeds to 424, where the system can extract further details of the request using NLP techniques. Then the request processing procedure 400 proceeds to 426.

At 426, the system determines whether the request can be fulfilled using a single source or multiple sources. If the request can be fulfilled using the single source, the request processing procedure 400 proceeds to 428, where a response is generated by applying a ML model to the request and the single source. Then, the request processing procedure 400 moves from 428 to 414.

If the request can be fulfilled using the multiple sources (as determined at 426), the request processing procedure 400 proceeds to 430, where a response is generated by applying a ML model to the request and the multiple sources. In some implementations, a correlation engine is applied to the multiple sources. In one example, the correlation engine can apply language-based correlation to the multiple sources, which provides correlation information between the multiple sources based on not only obvious similar words, but also underline context and meaning. In another example, the correlation engine can apply time-based correlation to the multiple sources, which provides correlation information between the multiple sources based on correlating time stamps in logs, metrics, alerts, scripts, or configurations in the multiple sources. In another example, the correlation engine can apply cognitive correlation, which provides correlation information between the multiple sources based on correlation through historical patterns and intelligence in the multiple sources. The request processing procedure 400 continues at 414 after 430.

Returning to 404, if the request is a generic request (e.g., the request 200 of FIG. 2B, or a request to summarize an existing incident stored in at least one internal database), the request processing procedure 400 proceeds to 432, where the request is processed by a generic request handler of the system (e.g., the generic request handler 108).

At 434, the system can apply a fine-tuned large language model (LLM) to the request to generate a response. The fine-tuned LLM can be trained using internal data (e.g., data stored in the data storage module 112 of FIG. 1). The request processing procedure 400 can then continue at 414 after 434.

FIGS. 5A-5B illustrate a flow chart of an example customized ML model 500, according to some aspects of the present disclosure. For convenience, the customized ML model 500 will be described as being performed by a system of one or more computers located in one or more locations (e.g., the system 100 of FIG. 1). The customized ML model 500 can be applied to a request that involves elastic search. For example, the request can ask the system to find incidents that are related to a specific key word.

At 502, the system receives a request from a group conversation.

At 504, the system extracts a text from the request. The text can be one or more key words or key phrases the request asks the system to search for.

At 506, the system preprocesses the extracted text to convert the text into numerical values. For example, the text can be processed using NLP techniques such as vectorization and embedding.

At 508, the system generates similarity mapping between the preprocessed text and numerical representation (e.g., data in vector format) of incident data stored in a database 512. The numerical representation of the incident data can be generated, for example, based on a diagram 520 as shown in FIG. 5B. The incident data from various incident tracking or managing systems (e.g., Service Now 522, Rally 524, JIRA 526) can be preprocessed (e.g., by applying vectorization and embedding) and converted to numerical representation. The numerical representation of the incident data can be stored in the database 512.

In some implementations, the similarity mapping can be based on a one-to-many Cosine similarity. In some other implementations, any suitable similarity metric (e.g., Euclidean distance) can be applied to generate the similarity mapping between the preprocessed text and the numerical representation of the incident data stored in the database 512.

In some implementations, data in the database 512 with similarity values larger than a threshold can be identified and included in a response.

At 510, the system can transmit the response to the group conversation (e.g., as described with respect to 414 of FIG. 4).

FIGS. 6A-6B illustrate a flow chart of an example customized ML model 600, according to some aspects of the present disclosure. For convenience, the customized ML model 600 will be described as being performed by a system of one or more computers located in one or more locations (e.g., the system 100 of FIG. 1). The customized ML model 600 can be applied to a request to find a defect that causes a current incident.

At 602, the system receives a request from a group conversation. The request includes a ticket ID of an incident (also referred to as an incident ID) and asks the system to find a defect that causes the incident represented by the incident ID.

At 604, the system checks text data in one or more defect databases 622 to find data that matches the incident ID. The one or more defect databases can be defect related data stored in one or more incident tracking systems (e.g., Rally or JIRA). In some implementations, the system can check the text data in the one or more defect databases using Regex NLP approaches.

At 606, if the system finds any text data matching the incident ID, the system can include the text data in the response and transmit the response to the group conversation at 614 (e.g., as described with respect to 414 of FIG. 4). Otherwise, the customized ML model 600 proceeds to 608, where the system can preprocess text information of the incident (e.g., by applying vectorization and embedding) and convert the text information to numerical representation. The text information of the incident can include short description of the incident, detailed description of the incident, business segment of the incident, and priority of the incident, etc.

At 610, the system generates similarity mapping between the preprocessed text information of the incident and a vector database 624. The vector database 624 stores numerical representation of the defect related data. As shown in diagram 620 of FIG. 6B, the numerical representation of the defect related data can be converted from the defect related data in text form stored in the one or more incident tracking systems (e.g., Rally or JIRA) by applying vectorization and embedding.

In some implementations, the similarity mapping can be based on a one-to-many Cosine similarity. In some other implementations, any suitable similarity metric (e.g., Euclidean distance) can be applied to generate the similarity mapping between preprocessed text information of the incident and the numerical representation of the defect related data stored in the vector database 624.

In some implementations, data in the vector database 624 with similarity values larger than a threshold can be identified and included in a response. The customized ML model 600 can proceed to 614, where the system can transmit the response to the group conversation (e.g., as described with respect to 414 of FIG. 4).

Figure 7:
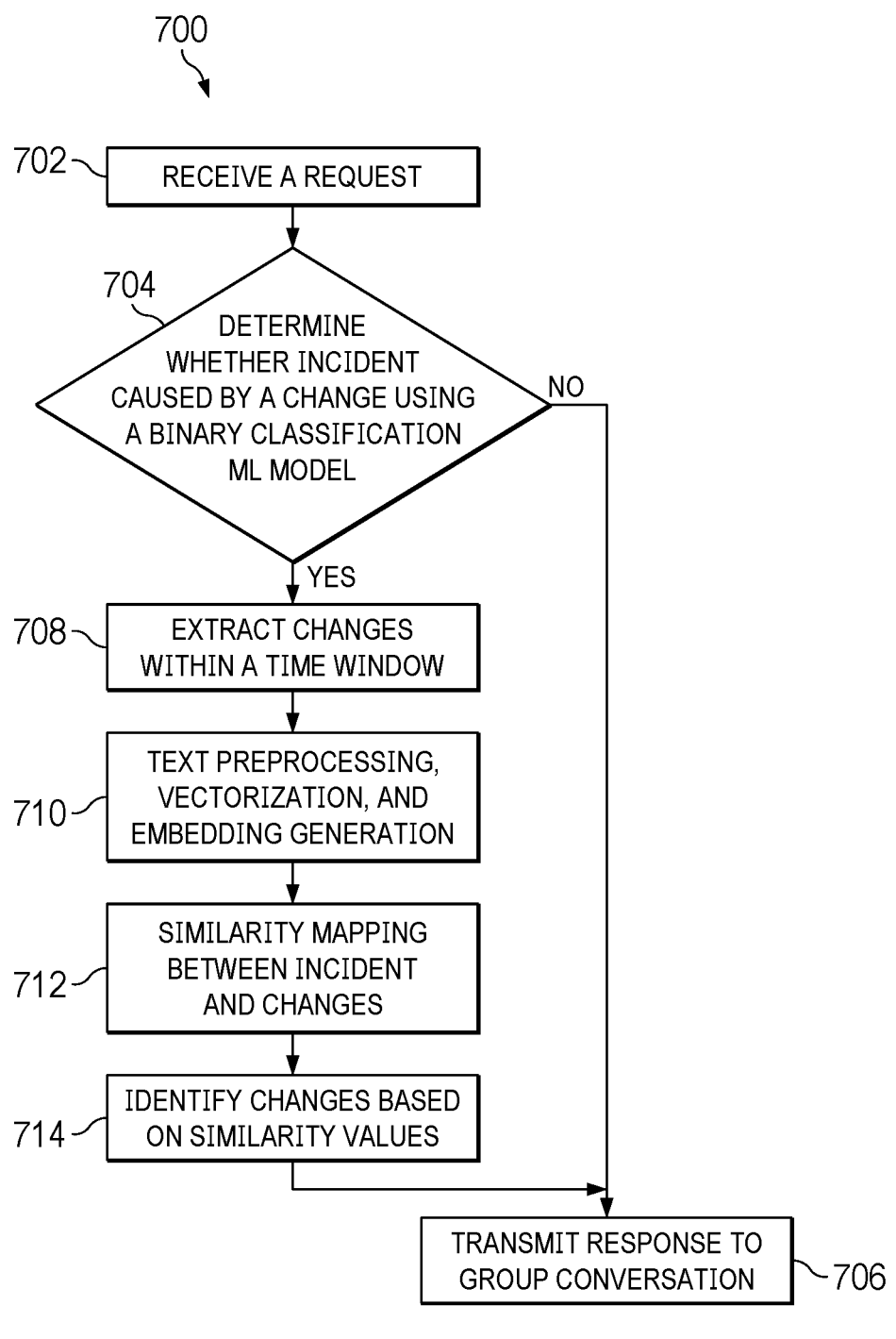
FIG. 7 illustrates a flow chart of another example customized ML model, according to some aspects of the present disclosure.

FIG. 7 illustrates a flow chart of an example customized ML model 700, according to some aspects of the present disclosure. For convenience, the customized ML model 700 will be described as being performed by a system of one or more computers located in one or more locations (e.g., the system 100 of FIG. 1). The customized ML model 700 can be applied to a request to find a change that causes a current incident.

At 702, the system receives a request from a group conversation. The request includes an incident ID and asks the system to find a change that causes an incident represented by the incident ID. In some implementations, the change can be a change to a development source code.

At 704, the system determines whether the incident is caused by any changes by applying a binary classification ML model to properties of the incident. In some implementations, the properties of the incident can include a configurational item (CI) of the incident, a short description of the incident, a detailed description of the incident, and an assignment group of the incident, etc. If the system determines that the incident is not caused by any changes, the customized ML model 700 proceeds to 706, where the system can generate a response indicating that no change causes the given incident and transmit the response to the group conversation (e.g., as described with respect to 414 of FIG. 4). If the system determines that the incident is caused by a change, the customized ML model 700 proceeds to 708.

At 708, the system can extract changes within a time window (e.g., within past two weeks). Then the system can find similarity between the extracted changes and the incident using various techniques (e.g., rule-based NLP approaches or ML models).

At 710, the system can preprocess text information of the properties of the incident (e.g., by applying vectorization and embedding) and convert the text information to numerical representation (data in vector format). Similarly, the system can also convert the extracted changes from text format to vector format.

At 712, system generates similarity mapping between the incident and the extracted changes (similar to 508 of FIG. 5A and 610 of FIG. 6A).

At 714, changes with similarity values larger than a threshold can be identified and included in a response. The customized ML model 700 can proceed to 706, where the system can transmit the response to the group conversation (e.g., as described with respect to 414 of FIG. 4).

In some implementations, a customized ML model similar to the models 500, 600, and 700 described with respect to FIGS. 5A-5B, 6A-6B, and 7 can be applied to process a request to find existing incidents in one or more internal databases similar to an input incident. In some implementations, the existing incidents in the internal databases can be filtered or can be given different weights when generating similarity values. For example, a time window can be applied to the existing incidents to select the recent ones (e.g., within past one year). In another example, larger weights can be assigned to the existing incidents with higher importance level (e.g., labeled as a "Major" incident). In some implementations, different weights can be assigned to the existing incidents based on which group an incident belongs to. For example, if the input incident is from a Banking department, then existing incident in the Banking department can be selected or can be given larger weights. In some implementations, when comparing similarity between two incidents, different weights can be applied to different properties of the incidents. For example, a weight of 60% can be assigned to a description of an incident, a weight of 20% can be assigned to a business impact of the incident, and a weight of 20% can be assigned to an CI of the incident. In some implementations, if an existing incident is found similar to the input incident, and that exiting incident was created recently (e.g., with past two hours), the system (e.g., the system 100 of FIG. 1) can generate a response including the existing incident and the generation time of the exiting incident. The response can serve as a clue or alert for the troubleshooting teams to use because a similar incident created recently can help them find a root cause of the input incident.

In some implementations, users in the group conversation can provide feedback after receiving the response. For example, the users can give the feedback by clicking a chat icon to indicate how satisfied they are with the response. The feedback from the users can be stored in the feedback database 118 of FIG. 1. Usage metrics also can be recorded and stored in the feedback database 118. The usage metrics can include alerts (e.g., an alert when the system goes down) and logs of operation of the system. The usage metrics can include capacity and performance monitoring information of the system (e.g., latencies of the system providing responses, accuracy of the responses, efficiency of the system). The usage metrics can further include reports on each functionality of the system and how they are used (e.g., which ML model is triggered most often). The user feedback and usage metrics stored in the feedback database 118 can be used to reinforce the NLP approaches and ML models of various request handlers in the system and improve the performance (e.g., reducing the response time and increasing the accuracy) of the system.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method performed by one or more computers, the method comprising:
    joining, by a chatbot, a group conversation in a messaging system in response to receiving an invitation to the group conversation;
    receiving, by the chatbot, a natural language request from a first user in the group conversation, the natural language request associated with a current incident;
    identifying, by the chatbot, authorization information associated with each user in the group conversation, the authorization information indicating whether each user is eligible to participate in the request;
    determining, by the chatbot, one or more authorization requirements associated with each user in the group conversation;
    in response to determining that the identified authorization information associated with each user in the group conversation satisfies the determined one or more authorization requirements associated with the natural language request confirming each user in the group conversation is eligible to participate in the request, determining, by the chatbot, a category of the natural language request;
    determining, by the chatbot, a processing approach based on the category of the natural language request; and
    applying, by the chatbot, the processing approach to generate a response.

2. The method of claim 1, wherein determining the category of the natural language request comprises:
    applying a classification machine learning (ML) model to the natural language request to select the category from predetermined categories comprising a rule-based category, a generic category, and a knowledge specific category,
    and wherein:
        the processing approach comprises a rule-based natural language processing algorithm when the natural language request belongs to the rule-based category;
        the processing approach comprises a customized ML model when the natural language request belongs to the knowledge specific category; and
        the processing approach comprises a fine-tuned large language model (LLM) when the natural language request belongs to the generic category.

3. The method of claim 2, wherein:
    the natural language request comprises a request to extract information associated with the current incident from the group conversation; and
    applying the processing approach comprises applying the rule-based natural language processing algorithm using regular expressions to extract the information from the group conversation.

4. The method of claim 2, wherein:
    the natural language request comprises a request to find incidents in at least one internal database similar to the current incident; and
    applying the processing approach comprises:
        applying the customized ML model to determine similarity values between existing incidents stored in the at least one internal database and the current incident; and
        selecting one or more of the existing incidents based on the similarity values.

5. The method of claim 2, wherein:
    the natural language request comprises a request to find a defect that causes the current incident; and
    applying the processing approach comprises one or more of:
        applying the customized ML model to use regular expressions to find a first defect stored in at least one internal database and associated with an identity of the current incident; or
        applying the customized ML model to find a second defect stored in the at least one internal database based on a similarity value between description of the second defect and the current incident.

6. The method of claim 2, wherein:
    the natural language request comprises a request to find a development change that causes the current incident; and
    applying the processing approach comprises:
        extracting historical development changes within a predetermined time window from at least one internal database;
        applying the customized ML model to determine similarity values between the historical development changes and the current incident; and
        selecting one or more of the historical development changes based on the similarity values.

7. The method of claim 2, wherein:
    the natural language request comprises a request to summarize an existing incident stored in at least one internal database; and
    applying the processing approach comprises applying the fine-tuned LLM model to generate a summary of the existing incident.

8. The method of claim 1, wherein the authorization information associated with each user in the group conversation comprises one or more of:
    whether the user works for an eligible company;
    whether the user is a member of an eligible internal team of the eligible company; or
    whether the user has authority to conduct an action comprised in the natural language request.

9. The method of claim 1, further comprising:
    transmitting the response to the group conversation; and
    upon request by the first user, sending the response to an email address provided by the first user.

10. The method of claim 1, further comprising:
    receiving feedback from the first user; and
    using the feedback as training data to reinforce one or more machine learning (ML) models comprised in the processing approach.

11. A system comprising:

one or more computers; and one or more storage devices storing instructions that when executed by the one or more computers cause the one or more computers to perform operations comprising:

joining, by a chatbot, a group conversation in a messaging system in response to receiving an invitation to the group conversation;

receiving, by the chatbot, a natural language request from a first user in the group conversation, the natural language request associated with a current incident;

identifying, by the chatbot, authorization information associated with each user in the group conversation, the authorization information indicating whether each user is eligible to participate in the request;

determining, by the chatbot, one or more authorization requirements associated with each user in the group conversation;

in response to determining that the identified authorization information associated with each user in the group conversation satisfies the determined one or more authorization requirements associated with the natural language request confirming each user in the group conversation is eligible to participate in the request, determining, by the chatbot, a category of the natural language request;

determining, by the chatbot, a processing approach based on the category of the natural language request; and applying, by the chatbot, the processing approach to generate a response.

12. The system of claim 11, wherein determining the category of the natural language request comprises:

applying a classification machine learning (ML) model to the natural language request to select the category from predetermined categories comprising a rule-based category, a generic category, and a knowledge specific category, and wherein:

the processing approach comprises a rule-based natural language processing algorithm when the natural language request belongs to the rule-based category;

the processing approach comprises a customized ML model when the natural language request belongs to the knowledge specific category; and the processing approach comprises a fine-tuned large language model (LLM) when the natural language request belongs to the generic category.

13. The system of claim 12 wherein:

the natural language request comprises a request to extract information associated with the current incident from the group conversation; and applying the processing approach comprises applying the rule-based natural language processing algorithm using regular expressions to extract the information from the group conversation.

14. The system of claim 12, wherein:

the natural language request comprises a request to find incidents in at least one internal database similar to the current incident; and applying the processing approach comprises:

applying the customized ML model to determine similarity values between existing incidents stored in the at least one internal database and the current incident; and selecting one or more of the existing incidents based on the similarity values.

15. The system of claim 12, wherein:

the natural language request comprises a request to find a defect that causes the current incident; and applying the processing approach comprises one or more of:

applying the customized ML model to use regular expressions to find a first defect stored in at least one internal database and associated with an identity of the current incident; or applying the customized ML model to find a second defect stored in the at least one internal database based on a similarity value between description of the second defect and the current incident.

16. The system of claim 12, wherein:

the natural language request comprises a request to find a development change that causes the current incident; and applying the processing approach comprises:

extracting historical development changes within a predetermined time window from at least one internal database;

applying the customized ML model to determine similarity values between the historical development changes and the current incident; and selecting one or more of the historical development changes based on the similarity values.

17. The system of claim 12, wherein:

the natural language request comprises a request to summarize an existing incident stored in at least one internal database; and applying the processing approach comprises applying the fine-tuned LLM model to generate a summary of the existing incident.

18. The system of claim 11, wherein the authorization information associated with each user in the group conversation comprises one or more of:

whether the user works for an eligible company;

whether the user is a member of an eligible internal team of the eligible company; or whether the user has authority to conduct an action comprised in the natural language request.

19. The system of claim 11, further comprising:

transmitting the response to the group conversation; and upon request by the first user, sending the response to an email address provided by the first user.

20. One or more non-transitory computer-readable storage media storing instructions that when executed by one or more computers cause the one or more computers to perform operations comprising:

joining, by a chatbot, a group conversation in a messaging system in response to receiving an invitation to the group conversation;

receiving, by the chatbot, a natural language request from a first user in the group conversation, the natural language request associated with a current incident;

identifying, by the chatbot, authorization information associated with each user in the group conversation, the authorization information indicating whether each user is eligible to participate in the request;

determining, by the chatbot, one or more authorization requirements associated with each user in the group conversation;

in response to determining that the identified authorization information associated with each user in the group conversation satisfies the determined one or more authorization requirements associated with the natural language request confirming each user in the group conversation is eligible to participate in the request, determining, by the chatbot, a category of the natural language request;

determining, by the chatbot, a processing approach based on the category of the natural language request; and applying, by the chatbot, the processing approach to generate a response.

* * * * *